United States Patent
Kino et al.

(10) Patent No.: US 12,529,486 B2
(45) Date of Patent: Jan. 20, 2026

(54) EVAPORATION HEATER

(71) Applicant: ZERO FOOD CO., LTD., Tokyo (JP)

(72) Inventors: Masato Kino, Ashiya (JP); Shigeru Miyatani, Ashiya (JP)

(73) Assignee: Zero Food Co., Ltd., Tokyo (JP)

( * ) Notice: Subject to any disclaimer, the term of this patent is extended or adjusted under 35 U.S.C. 154(b) by 259 days.

(21) Appl. No.: 18/034,512

(22) PCT Filed: Nov. 10, 2021

(86) PCT No.: PCT/JP2021/041388
§ 371 (c)(1),
(2) Date: Apr. 28, 2023

(87) PCT Pub. No.: WO2022/102667
PCT Pub. Date: May 19, 2022

(65) Prior Publication Data
US 2024/0019138 A1  Jan. 18, 2024

(30) Foreign Application Priority Data

Nov. 10, 2020  (JP) .................................. 2020-187444

(51) Int. Cl.
*F24F 6/02*  (2006.01)
*F24F 6/14*  (2006.01)
(Continued)

(52) U.S. Cl.
CPC ................. *F24F 6/02* (2013.01); *F24F 6/14* (2013.01); *F25D 17/042* (2013.01);
(Continued)

(58) Field of Classification Search
CPC .......... F24F 6/02; F24F 6/14; F24F 2006/008; F24F 2006/143; F25D 17/042; F25D 2317/0413
See application file for complete search history.

(56) References Cited

U.S. PATENT DOCUMENTS

| | | | | |
|---|---|---|---|---|
| 2008/0257985 A1* | 10/2008 | Nicolai | ..................... | B05B 9/04 |
| | | | | 239/373 |
| 2016/0138816 A1* | 5/2016 | Flaxer | ...................... | F24F 6/10 |
| | | | | 261/119.1 |

(Continued)

FOREIGN PATENT DOCUMENTS

| | | |
|---|---|---|
| JP | S58-193069 A | 11/1983 |
| JP | S60-118473 U | 8/1985 |

(Continued)

OTHER PUBLICATIONS

Office Action dated Feb. 6, 2024 issued in the corresponding Japanese Patent Application No. 2022-561967 with an English translation thereof.

(Continued)

*Primary Examiner* — Jonathan Bradford
(74) *Attorney, Agent, or Firm* — Carrier, Shende & Associates; Joseph P. Carrier; Fulchand P. Shende

(57) ABSTRACT

An evaporation heater arranged in a constant-temperature high-humidity storage, the evaporation heater includes a water storage tank arranged in a lower part of an enclosure of the evaporation heater; a temperature regulator configured to set water stored in the water storage tank to a target temperature; and an air blowing mechanism which is arranged in front in an air-blowing direction with respect to the water storage tank and which is configured to blow air to water in the water storage tank, set the temperature inside the constant-temperature high-humidity storage to the target temperature, and hold the humidity inside the constant-temperature high-humidity storage at saturated humidity.

11 Claims, 6 Drawing Sheets

(51) Int. Cl.
  *F25D 17/04* (2006.01)
  *F24F 6/00* (2006.01)
(52) U.S. Cl.
  CPC ... *F24F 2006/008* (2013.01); *F24F 2006/143* (2013.01); *F25D 2317/0413* (2013.01)

(56) References Cited

U.S. PATENT DOCUMENTS

2017/0319811 A1* 11/2017 Foote ................. A61M 16/142
2019/0137127 A1* 5/2019 Haack ..................... F24F 6/12

FOREIGN PATENT DOCUMENTS

| | | | |
|---|---|---|---|
| JP | S60-118474 U | 8/1985 | |
| JP | H01-174875 A | 7/1989 | |
| JP | H05-032929 U | 4/1993 | |
| JP | H06-265254 A | 9/1994 | |
| JP | H08-42960 A | 2/1996 | |
| JP | 2002-253400 A | 9/2002 | |
| JP | 2004-003778 A | 1/2004 | |
| JP | 2005-214593 A | 8/2005 | |
| JP | 2006-317129 A | 11/2006 | |
| JP | 2007-285565 A | 11/2007 | |
| JP | 2007-303708 A | 11/2007 | |
| JP | 2014-031905 A | 2/2014 | |
| JP | 2017-009274 A | 1/2017 | |
| JP | 2017-125648 A | 7/2017 | |
| JP | 6453264 B2 | 1/2019 | |
| JP | 2021-063805 A | 4/2021 | |
| KR | 2016-0096896 A | 8/2016 | |

OTHER PUBLICATIONS

The extended European search report dated Sep. 9, 2024 issued in the corresponding EP Patent Application No. 21891913.2.

* cited by examiner

EVAPORATION HEATER

TECHNICAL FIELD

The present invention relates to an evaporation heater of water to be used in a constant-temperature high-humidity storage.

BACKGROUND ART

Conventionally, a constant-temperature high-humidity storage (hereinafter, sometimes referred to as a "storage") is used to store an object to be temperature-controlled (for example, food such as meat, fish, and vegetables) which requires temperature control in a fresh state. Generally, since the lower the temperature at which food is stored, the easier the food can be kept fresh, setting the temperature inside the constant-temperature high-humidity storage to a low temperature and a high humidity ensures that food stays fresh.

70 percent to 80 percent of meat and seafood and 80 percent to 90 percent or more of fruits and vegetables is water. When food is cooled to below freezing point in a low-temperature storage, the moisture freezes and a volume thereof expands, and large ice crystals form in an extracellular fluid of the food. Accordingly, cell membrane of the food is ruptured and the food is to be frozen in such a state. When thawed, an outflow of drip occurs.

In addition, the inside of the storage becomes dry due to frosting on an evaporator during refrigeration, defrosting, and drainage of defrost water to outside of the storage. Drying particularly degrades the quality of fruits and vegetables and/or flower and ornamental plants. Drying also causes a decline in quality of livestock meat during aging of the livestock meat by refrigeration.

In consideration thereof, Patent Literature 1 discloses an evaporator for storage in which a cold-air temperature humidity change unit including an ice-breaking heat exchanger is arranged adjacent to a first air blowing mechanism and a second air blowing mechanism between the first air blowing mechanism and the second air blowing mechanism. Since the cold-air temperature humidity change unit has ice fed from an ice crushing unit, an airflow basically comes into contact with the ice and becomes a 0° C.-airflow.

In addition, due to melting of ice and vaporization of melted moisture, the inside of the storage is filled with water vapor and becomes a high humidity space environment with an internal temperature of 0° C. and a relative humidity of around 100%. Therefore, by managing food and the like stored in the storage at approximately 0° C. and high humidity, quality of the food and the like can be maintained. Besides the patent literature described above, humidification apparatuses may employ water spray humidification, ultrasonic water humidification, heater steam humidification, humidification by air blasting and vaporization to aqueous material, and the like.

Bubble humidifiers are generally used for medical purposes of supplying inspired oxygen in the form of bubbles in water during oxygen inhalation to humidify a discharge gas.

Patent Literature 2 describes an evaporator which is provided with a bubble generation apparatus inside a water tank and which supplies, by a duct, an adjacent environmental test room with humidified air generated from a water surface.

Patent Literature 3 describes a humidifier which generates bubbles by turning water in a water tank into hot water using a heating apparatus and which mixes humidified air generated from a water surface with blast air using an air blowing mechanism and supplies the mixed air to the outside.

CITATION LIST

Patent Literature

Patent Literature 1: Japanese Patent No. 6453264
Patent Literature 2: Japanese Patent Laid-Open No. 2021-063805
Patent Literature 3: Japanese Utility Model Laid-open No. H5-32929

SUMMARY OF INVENTION

Technical Problem

In the evaporator described in Patent Literature 1, crushed ice below freezing point produced by an ice machine is heated to 0° C. and a surface of the ice is covered by melted water. The surface melted water evaporates when the ice surface is struck by air and water vapor of 0° C. is generated and fed to the inside of the storage. However, for example, in a case of a 33 square meter prefabricated storage, the evaporator described in Patent Literature 1 consumes 60 kg to 70 kg of crushed ice per day using a 60 Hz, single-phase 100 V, 493 W ice machine in order to maintain the inside of the storage at a constant temperature and saturated humidity after the inside of the storage reaches 0° C. and a relative humidity of 100%.

However, a fall distance and a fall time of crushed ice passing through the evaporator are extremely short. Therefore, since a large portion of the falling crushed ice is discharged to the outside of the evaporator through a drain, power consumption for producing crushed ice with the ice machine is large and a large portion of the power consumption is to be consumed in waste. Furthermore, a large portion of water used by the ice machine is also wasted. There is a need for an apparatus which cuts down on such waste.

In addition, in the case of water spray humidification, minute water droplets are mixed into a blown airflow and contaminate the inside of the storage with water. With ultrasonic water humidification, precipitation of calcium salt or the like in tap water causes contamination of the inside and/or around the storage. With heater steam humidification, mixing of water vapor of 100° C. increases unevenness of temperature inside the storage and increases a burden on a cold air blower. Furthermore, it is difficult to humidify the storage to high humidity by a method of impregnating a sponge with water and air blasting and vaporizing the water.

An object of the present invention is to provide a novel evaporation heater for storage which is capable of reducing power consumption and water consumption, preventing contamination of inside and/or around the storage, reducing unevenness of temperature inside the storage, and humidifying the inside of the storage to a high humidity.

In addition, with the conventional bubble humidifier and/or the humidifier disclosed in Patent Literature 2 described above, bubbling noise and/or a "whoosh" noise is created when bubbles break on the water surface. There is also a problem in that a humidifying capacity declines when the water temperature is low. For example, since a bubble humidifier humidifies a closed space, simply changing the bubbles generated by the bubble humidifier to fine bubbles which are miniaturized bubbles in order to prevent the generation of noise and ensure a certain humidifying amount even at a low temperature prevents an amount of discharge air (oxygen) at most from equaling or exceeding an amount of air intake and a problem of an insufficient discharge amount arises.

A constant-temperature high-humidity storage refers to a storage which maintains a constant inside temperature and in which food and the like are stored in a state where air inside the storage contains an amount of saturated water vapor at the inside temperature or a similar amount of water vapor and relative humidity is 80% to 100%.

Furthermore, noise is also created in the humidifier described in Patent Literature 3. Moreover, since air mixed with vapor from hot water is blown, the vapor must be cooled to a target temperature, which makes it difficult to use the humidifier in a constant-temperature storage.

Solution to Problem

An evaporation heater according to the present invention is
an evaporation heater arranged in a constant-temperature storage, the evaporation heater comprising:
a water storage tank provided in an internal space of an enclosure of the evaporation heater;
a stored water temperature regulator configured to control a temperature of at least one of feed water to be fed to the water storage tank and stored water in the water storage tank so that the temperature is within a target stored water temperature range which corresponds to a target inside temperature range of the constant-temperature storage; and
an air blowing mechanism configured to generate an airflow and cause the airflow to come into contact with water stored in the water storage tank.

With the evaporation heater according to the present invention, by bringing an airflow generated by an air blowing mechanism into contact with feed water and/or stored water of which a temperature is controlled to within a target stored water temperature range, water vapor at a temperature within a target inside temperature range can be generated. Air containing the water vapor in a high-humidity state is introduced into the storage, a storage temperature is controlled to within the target inside temperature range, and high humidity is maintained. The present evaporation heater itself may be an inside temperature controller.

When the inside temperature of the storage (a temperature of an internal space of the storage) drops below a lower limit temperature of the target inside temperature range and water vapor becomes supersaturated, the supersaturated water vapor comes into contact with the feed water and/or the stored water, a part of the supersaturated water vapor condenses, and a temperature of the feed water and/or the stored water slightly rises. Since a temperature of air near a water surface rises as the temperature of the feed water and/or the stored water rises, a relative humidity of the air slightly decreases, an amount of evaporation from the water increases, and the water vapor of an air layer near the water once again enters an approximately saturated state.

In addition, when the atmosphere inside the storage enters a partial and/or a temporary supersaturated state in accordance with an airflow brought into contact with the feed water and/or the stored water by the air blowing mechanism, a part of water vapor of the atmosphere is condensed to water and mixes with the feed water and/or the stored water. When the inside humidity of the storage drops accordingly, a part of the feed water and/or the stored water evaporates and mixes with the atmosphere inside the storage. By stabilizing the temperature of the feed water and/or the stored water in the water storage tank due to absorption and liberation of latent heat and causing water vapor at a temperature within the target inside temperature range to be steadily fed to the inside of the storage, the inside temperature can be controlled in a stable manner.

Preferably, the evaporation heater configured as described above comprises a stirring apparatus configured to stir the water stored in the water storage tank.

According to the evaporation heater configured as described above, due to an airflow generated by the air blowing mechanism coming into contact with the stored water in the water storage tank over a long period of time, a portion of the stored water near a surface freezes and an amount of evaporation from the stored water to the atmosphere inside the storage decreases due to a gradual growth of ice. However, by stirring the stored water in the water storage tank with the stirring apparatus, freezing of the stored water and, in turn, a reduction in the amount of evaporation can be suppressed or prevented.

Therefore, even when the temperature of the stored water is near 0° C. due to providing the stirring apparatus, the temperature and the humidity inside the storage can be controlled in a stable manner even with ordinary tap water and without having the stored water contain an antifreeze agent. The stirring apparatus may be configured to mechanically stir the stored water or configured to generate a current of water in the water storage tank by causing water to flow into or circulate in the stored water. In order to conserve energy consumption, the stirring apparatus may be intermittently operated or driven. A heater (heating apparatus) may be provided in the water storage tank in order to suppress or prevent freezing of a portion near a surface of the stored water when the storage is sufficiently cooled to below 0° C.

Preferably, the evaporation heater configured as described above comprises a water feeding apparatus configured to feed water in a shower state or a mist state to the water storage tank.

According to the evaporation heater configured as described above, by bringing an airflow generated by the air blowing mechanism into contact with water or water droplets in the form of a shower or a mist which is fed from the water feeding apparatus to the water storage tank, a part of the water can be evaporated to water vapor.

Since heat of vaporization is covered by having water vapor generated from water droplets lower a temperature of surrounding water droplets, when the water droplets are relatively small, for example, the surrounding water droplets are cooled to near 0° C. due to the heat of vaporization and a temperature of water vapor generated from the surrounding water droplets also falls to near 0° C. On the other hand, when the water droplets are relatively large, the temperature of surrounding water droplets approaches the temperature of the stored water in the water storage tank and the temperature of generated water vapor also approaches the vicinity of the temperature of the stored water. Therefore, a size of the water droplets may be controlled in accordance with a target inside temperature. In addition, adjusting the temperature of the stored water with an airflow containing generated water vapor is effective in keeping the inside temperature within the target inside temperature range. The temperature of feed water may be controlled such that the temperature of the feed water is raised when the temperature of the airflow is lower than a lower limit temperature of the target inside temperature range but the temperature of the feed water is lowered when the temperature of the airflow is higher than an upper limit temperature of the target inside temperature range.

Preferably, the evaporation heater configured as described above comprises a guide member configured to guide an airflow generated by the air blowing mechanism in a direction opposite to a feed direction of water with respect to the water storage tank by the water feeding apparatus.

According to the evaporation heater configured as described above, a time to arrival of the feed water at the stored water can be extended (for example, a fall velocity of water droplets can be reduced) and a contact time between the water droplets and air can be extended. As a result, an amount of evaporation of the feed water can be increased and inside humidity can be controlled to a target humidity or a humidity within a target humidity range in a shorter period of time. In addition, a reduction in an amount of used water is achieved.

A "direction opposite to a feed direction of water" means that an angle formed between a velocity vector of water and a velocity vector of the airflow ranges from 150° to 180°. For example, when water is fed to a water storage tank in a mode where water droplets are dropped downward, the airflow may be guided upward and brought into contact with the water droplets.

A blow-off valve and/or a second air blowing mechanism for adjusting a direction of an airflow to a direction opposite to a feed direction of water may be installed in a space which is at least partially enclosed by the guide member.

Preferably, in the evaporation heater configured as described above, a hydrophilic layer which has an affinity for water is provided on an inside surface of the water storage tank.

According to the evaporation heater configured as described above, water adheres to the hydrophilic layer on a wall surface which is near the inside surface of the water storage tank and which water and/or water droplets strike, and water vapor can be generated by bringing an airflow generated by the air blowing mechanism into contact with the hydrophilic layer. For example, when an airflow comes into contact with the stored water in the water storage tank, the stored water flows toward the inside surface of the water storage tank along a direction of the airflow and spreads while wetting the inside surface of the water storage tank. When an airflow generated by the air blowing mechanism is brought into contact with the inside surface of a water storage tank in a state where water has wetted and spread over the inside surface, an increase in an amount of generated water vapor is achieved as compared to a case where a hydrophilic layer is not provided on the inside surface of the water storage tank. Water vapor at the target inside temperature can be obtained by adjusting a water temperature of the water storage tank and, in turn, a water storage tank inside surface temperature with the stored water temperature regulator based on measurement results of respective temperatures of the water vapor and the air-mixture airflow.

For example, the hydrophilic layer is realized by applying a hydrophilic agent such as titanium oxide to the inside surface of the water storage layer.

Preferably, in the evaporation heater configured as described above,
the water feeding apparatus is configured to feed water in a shower state or a mist state with respect to the water storage tank during a period in which an operation of the air blowing mechanism has been suspended.

In addition, preferably, when feeding of water with respect to the water storage tank is completed or suspended (for example, when a water level of the water storage tank reaches a predetermined position), an operation of the air blowing mechanism is started or restarted to generate an airflow and the airflow is brought into contact with water adhering to the hydrophilic layer.

Furthermore, the water feeding apparatus may be configured to intermittently feed water in a mist state or a shower state with respect to the water storage tank while continuously operating the air blowing mechanism.

Due to such intermittent feeding of water, water vapor derived from water droplets can be transpired to an airflow during a feed suspension period of the water.

In this case, the water feeding apparatus can be caused to feed water in a mist state or a shower state with respect to the water storage tank and the water or water droplets can be caused to be approximately uniformly adsorbed and held by the inside surface of the water storage tank on which the hydrophilic layer is formed.

For example, in the internal space of the storage in a low-temperature state near 0° C., latent heat of vaporization is seven times or more greater than latent heat of solidification. Since a size of water droplets atomized to a shower state or a mist state is extremely small, a temperature of the water droplets drops by an amount of heat of vaporization when a part of the water droplets evaporates, and the water droplets freeze and become rime. The rime is adsorbed and held by the inside surface of the water storage tank on which a hydrophilic layer is provided or formed and/or a surface of the stored water and then thawed by the stored water at a temperature within the target stored water temperature range. Furthermore, by suspending an operation of the air blowing mechanism and, in turn, an airflow during the feed period of water, penetration of fog and/or rime into the storage can be suppressed or prevented.

When water droplets are minute in a low-humidity environment, since a temperature of the water droplets may drop to 0° C. due to latent heat of vaporization, there is no need for cooling and the stored water temperature regulator can directly use tap water in addition to stored water.

Preferably, in the evaporation heater configured as described above,
the water stored in the water storage tank contains an antifreeze agent.

According to the evaporation heater configured as described above, the stored water in the water storage tank can be kept in a liquid state and an increase in an evaporation rate can be achieved over sublimation of ice.

Preferably, the evaporation heater configured as described above comprises a fine bubble generation apparatus configured to generate mixed water containing minute bubbles, wherein the fine bubble generation apparatus is configured to provide the water storage tank with the mixed water.

In bubble humidification with bubbles of a general size, air is fed to an air ejection hole provided in the water storage tank with an air pump to generate bubbles in water. The bubbles in the water take in water vapor from its surroundings and become high-humidity air. In addition, when the bubbles come up to the water surface, the bubbles rupture and spray minute water droplets near the water surface. The sprayed minute water droplets are vaporized in a short period of time by air blown on the water surface and raise a relative humidity of the blown air on the water surface, and the humidity inside the storage can be raised in a short period of time by feeding high-humidity blown air into the storage.

In the case of the fine bubble humidification according to the present system, methods of fine bubble generation include an ejector system, a swirling flow system and/or a pressure dissolution system, fine bubbles refer to bubbles of which a diameter is 100 μm or less, and air intake is natural aspiration in an ejector and/or a swirling flow.

When a closed space is humidified by fine bubbles as described above, use as a humidifier of the above configured evaporation heater is difficult due to a reduced amount of discharged air.

However, combining with air blowing and humidification to the water surface of the water storage tank enables mutual shortcomings to be offset. Simply blowing air and humidifying the water surface do not constitute forced humidification such as steam humidification, ultrasonic humidification and/or spray humidification and only provide a slow rate of humidification.

Although fine bubbles are created in a small closed space that is the fine bubble generation apparatus, in the present combined system, since water vapor-mixed air is released from the water surface of the water storage tank to a larger storage space by an air blowing mechanism, an amount of blown air is not to be limited by an amount of discharged fine bubbles.

Since fine bubbles have a small bubble diameter and are present in a large amount, a total gas-liquid contacting area in the bubbles is extremely large. Therefore, high-humidity bubbles are formed by vaporization of water from surrounding water to air inside the bubbles and the formed bubbles are released into water and/or the water surface. In particular, after dissolution of air into water reaches saturation, bubbles flow to the water surface instead of vanishing into water and releases high-humidity air to the water surface.

Since fine bubbles have a small bubble diameter, a buoyancy force of the fine bubbles is small and, due to viscous resistance of water, the fine bubbles take a long time to float up to the water surface. Therefore, when comparing a case of forming fine bubbles with a case of forming bubbles with a normal bubble diameter, a larger amount of water is evaporated inside the bubbles. As a result, when forming fine bubbles, the air generated from the water surface is humidified to high humidity. In addition, since each bubble is negatively charged, the bubbles repel each other and rise without binding with each other. Since an amount of saturated water vapor in air is small when the inside temperature and/or water temperature is low, the relative humidity inside the storage can be sufficiently rapidly increased even with the amount of discharged fine bubbles.

By releasing the fine bubbles to the water surface, surface tension of the water surface can be reduced by a large number of minute bubbles, vaporization of water molecules near the water surface can be promoted by supplying the water molecules with kinetic energy due to ultrasonic waves generated when the bubbles rupture, and air inside the storage can be humidified relatively quickly by blowing air to the water surface with an air blowing mechanism. By adopting a water temperature of the water storage tank as a target stored water temperature, released water vapor can be adjusted to a same temperature as the water temperature of the water storage tank, and since specific heat of water vapor is approximately three times higher than that of air, partial pressure of saturated water vapor in air increases and humid air at the target inside temperature has a large heat capacity particularly when the inside temperature is high, a contribution is made towards stabilizing the temperature inside the constant-temperature storage. In addition, freezing can be prevented by a current of water created by water fed from a fine bubble-containing water discharge pipe even when the inside temperature and/or the water temperature is near 0° C.

Advantageous Effects of Invention

As described above, according to the present invention, a novel evaporation heater for storage which is capable of reducing power consumption and water consumption is provided. In addition, water in a shower state or a mist state is intermittently fed from a water feeding apparatus (atomizer) to a water storage tank and an airflow generated by an air blowing mechanism is brought into contact with stored water during a water feed suspension period. Due to alternately switching between atomization and airflow generation and performing intermittent operations of modes, contamination of the inside of the storage by water droplets can be suppressed or prevented. Furthermore, generation of sound during feeding of water in order to atomize minute water droplets can be suppressed or prevented.

DESCRIPTION OF EMBODIMENTS

First Embodiment

Figure 1:
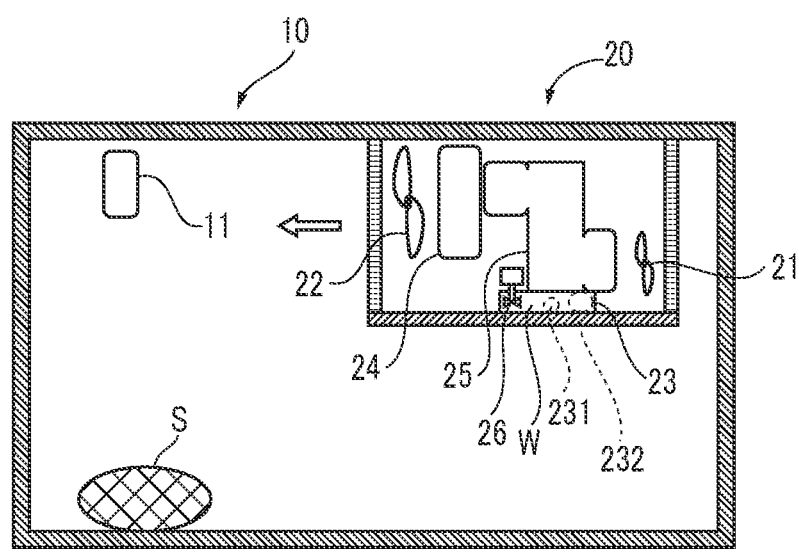
FIG. 1 is a sectional side planar view showing a schematic configuration of a storage according to an embodiment of the present invention.

FIG. 1 is a diagram showing a schematic configuration of a constant-temperature high-humidity storage according to an embodiment of the present invention.

As shown in FIG. 1, in the present embodiment, an inside temperature humidity sensor 11 and an evaporation heater 20 are arranged in an internal space of a constant-temperature high-humidity storage 10 (hereinafter, sometimes referred to as a "storage"). The inside temperature humidity sensor 11 is a sensor for measuring an inside temperature (an atmosphere temperature of the internal space) and an inside humidity (an atmosphere humidity of the internal space) of the storage 10. In addition, food such as meat, fish, vegetables, and the like are stored as stored objects S in the internal space of the storage 10.

Figure 2:
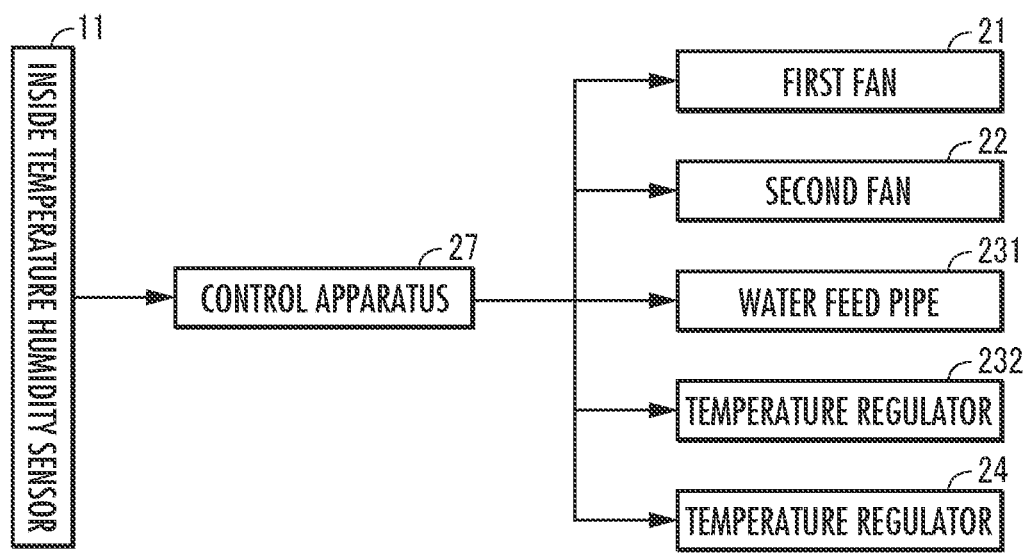
FIG. 2 is a block diagram of an evaporation heater according to the embodiment of the present invention.

The inside temperature and the inside humidity or output signals representing the inside temperature and the inside humidity are transmitted from the inside temperature humidity sensor 11 to a control apparatus (controller) 27. In addition, based on the measured inside temperature and the measured inside humidity, the control apparatus 27 controls operations of a first air blowing mechanism and a second air blowing mechanism to be described below. FIG. 2 shows a block diagram including the control apparatus 27.

As shown in FIG. 1, the evaporation heater 20 according to the present embodiment is provided with a first air blowing mechanism 21 and a second air blowing mechanism 22 and comprises a water storage tank 23 arranged in a lower part of an enclosure of the evaporation heater 20 between the first air blowing mechanism 21 and the second air blowing mechanism 22. When the first air blowing mechanism 21 and the second air blowing mechanism 22 are axial fans, each air blowing mechanism is constituted of a rotary drive apparatus such as an electric motor, a rotary shaft which is coupled to and rotationally driven by an output shaft of the rotary drive apparatus, and blades mounted to the rotary shaft so as to protrude in a direction perpendicular to an axial direction of the rotary shaft. The air blowing mechanisms may adopt systems other than an axial fan such as a centrifugal fan.

In addition, an inside temperature regulator 24 is arranged on a side of the second air blowing mechanism 22 in the water storage tank 23 and the water storage tank 23 and the inside temperature regulator 24 are connected to each other by a guide cylinder 25 (guide member). Furthermore, a stirrer 26 is arranged inside the water storage tank 23. In addition, a water feed pipe 231 for feeding water W into the water storage tank 23 and a stored water temperature regulator 232 for keeping a temperature of the water W at a temperature within a target stored water temperature range are arranged in the water storage tank 23.

Since a stored water temperature and/or a feed water temperature can be adjusted by the inside temperature and the inside temperature can be adjusted to a target temperature range and since the evaporation heater itself can be an inside temperature regulator, the inside temperature regulator 24 is not an essential constituent element and can be appropriately omitted depending on the purpose, but arranging the inside temperature regulator 24 produces advantageous effects as will be described later.

In the present embodiment, first, the water W is stored inside the water storage tank 23 by the water feed pipe 231 and the water W is kept at a target stored water temperature by the stored water temperature regulator 232.

Next, as exemplified by blown air indicated by an arrow in the drawing, the first air blowing mechanism 21 generates an airflow which comes into contact with the water W stored in the water storage tank 23 and which is adjusted to be included in the target stored water temperature range by the stored water temperature regulator 232. For example, the target stored water temperature range is set to a temperature range which is higher than the target inside temperature range by 2° C. to 5° C. Water vapor is generated from the stored water brought into contact with the airflow in the water storage tank 23 and the water vapor is introduced into the inside temperature regulator 24 through the guide cylinder 25. In this case, a temperature of the water vapor is cooled to a target temperature by control of the inside temperature regulator 24 by the control apparatus 27 and relative humidity rises, air containing the water vapor in a saturated state is introduced to the storage 10 by the second air blowing mechanism 22 as indicated by an arrow in the drawing, the temperature inside the storage 10 can be set to a target temperature, and the humidity inside the storage 10 can be kept at high humidity. Therefore, the stored objects S such as food which are stored in the storage 10 are managed at a predetermined target temperature and high humidity and a quality of the stored objects S can be maintained.

When the temperature inside the storage 10 falls below the target temperature due to an operation of a temperature regulator and water vapor becomes supersaturated, supersaturated water vapor is blown to a water surface of the water storage tank 23, comes into contact with the water surface and condenses, and slightly raises the temperature of the water W of the water storage tank 23. When the water temperature rises, a temperature near the water surface also rises while relative humidity slightly falls, an amount of evaporation from the water surface increases, and water vapor once again enters a saturated state. Therefore, the relative humidity inside the storage 10 is kept at about saturated humidity at the same temperature.

In addition, when an airflow is generated by an operation of the first air blowing mechanism 21 and the relative humidity of the internal space of the storage 10 becomes supersaturated by bringing the airflow into contact with the water W (stored water) in the water storage tank 23, water droplets having been exposed due to the creation of a supersaturated state are incorporated into the water W in the water storage tank 23, and when the relative humidity of the internal space of the storage 10 drops, the water W evaporates and is diffused in the atmosphere inside the storage 10 as water vapor. The temperature of the stored water in the water storage tank 23 can be stabilized by absorption and liberation of latent heat at this point, and the temperature inside the storage 10 can be stabilized by constantly feeding water vapor at a temperature within the target stored water temperature range.

As described above, in the present embodiment, since the evaporation heater 20 is used which obtains cold air at a target temperature and saturated humidity to be fed inside the storage 10 by blowing air with a fan 21 to the water W stored in the water storage tank 23, water consumption and power consumption can be reduced as compared to conventional evaporators which use an ice machine.

In the present embodiment, since the stirrer 26 is arranged in the water storage tank 23, even when an airflow generated by the first air blowing mechanism 21 is brought into contact with the water W in the water storage tank 23 over a long period of time, freezing of a portion near a water surface of the water W can is suppressed or prevented. Therefore, a reduction in an amount of evaporation of the water W due to freezing of a portion near the water surface can be suppressed. As a result, the inside temperature and the inside humidity can be controlled by ordinary tap water alone without having to use an antifreeze agent.

For reference purposes, a relationship between air temperature and an amount of saturated water vapor is shown in Table 1.

TABLE 1

| Air temperature (° C.) | Amount of saturated water vapor (g/m$^3$) |
|---|---|
| 50 | 82.8 |
| 40 | 51.1 |
| 35 | 39.6 |
| 30 | 30.3 |
| 25 | 23.0 |
| 20 | 17.2 |
| 15 | 12.8 |
| 10 | 9.39 |
| 5 | 6.79 |
| 0 | 4.85 |

In place of mechanical stirring such as by the stirrer 26, hydraulic pressure-based stirring such as by a water current generator which injects water in water to create a current of water can also be used. In addition, a heater can also be used. Desirably, stirring is performed intermittently in order to conserve energy consumption.

In addition, in the present embodiment, the addition of an antifreeze agent to the water W stored in the water storage tank 23 is not excluded. In this case, even when the stirring apparatus and/or a heater (heating apparatus) or the like are not provided, the water W in the water storage tank 23 can be maintained in a liquid state and an increase in an evaporation rate is achieved over sublimation from ice. Desirably, the antifreeze agent is a salt such as sodium chloride and/or calcium chloride when the water temperature is around 0° C. and alcohol when the water temperature is equal to or lower than −5° C.

Modification of First Embodiment

In the first embodiment, a hydrophilic layer may be formed on the inside surface of the water storage tank 23 (for example, in a portion higher than at least a stored water level of the inside surface of the water storage tank). In this case, water can be adsorbed and held by the inside surface of the water storage tank on which the hydrophilic layer is formed and, by bringing an airflow into contact with the water, water vapor derived from the water can be generated.

When forming the hydrophilic layer on the surface of the water storage tank, a known hydrophilic agent is compounded such as firing a titanium oxide layer on a surface of a ceramic panel.

Second Embodiment

Figure 3:
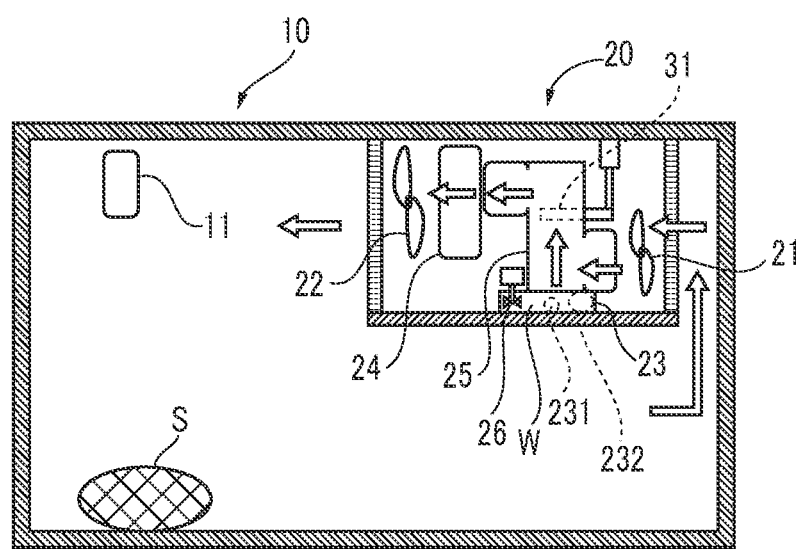
FIG. 3 is a sectional side planar view showing a schematic configuration of a storage according to another embodiment of the present invention.

FIG. 3 shows a schematic configuration diagram of a constant-temperature high-humidity storage according to another embodiment of the present invention.

While the present embodiment differs from the first embodiment in that, when storing water W in the water storage tank 23, a water feeding apparatus 31 arranged above the water storage tank 23 is used in a guide space entirely (or partially) enclosed or defined by the guide cylinder 25 (guide member) instead of the water feed pipe 231 arranged inside the water storage tank 23, other components and the like are more or less similar to those of the first embodiment.

In the present embodiment, by releasing or atomizing water in a shower state or a mist state to the water storage tank 23 by the water feeding apparatus 31 and generating an airflow between the water storage tank 23 and the water feeding apparatus 31 by the first air blowing mechanism 21, an increase in an amount of generation of water vapor derived from the water is achieved. Since the airflow generated by an operation of the first air blowing mechanism 21 flows along the guide space defined by the guide cylinder 25, the airflow is sent between the water storage tank 23 and the water feeding apparatus 31.

A temperature of water vapor generated from water droplets generates latent heat of vaporization by lowering a temperature of surrounding water droplets. Therefore, for the water vapor temperature in a case where a water droplet diameter is small, the temperature of water droplet water approaches 0° C. due to the water droplet water being cooled by the latent heat of vaporization and the temperature of water vapor generated from the water droplets also approaches 0° C. On the other hand, in a case where the water droplet diameter is large, the temperature of the water droplet water approaches a temperature of the stored water in the water storage tank and the temperature of generated water vapor also approaches the vicinity of the temperature of the stored water. Therefore, the water droplet diameter is determined in accordance with a target temperature.

A case where the water droplet diameter is small means, for example, a case where the water droplet diameter is 0.5 mm to 1 mm, and a case where the water droplet diameter is large means, for example, a case where the water droplet diameter is 1 mm to 3 mm. The water droplet diameter may be measured using an intermittent irradiation laser and an ultrafast video camera. In addition, a back calculation can be performed from an airflow velocity which enables a sufficient midair residence time of water droplets to be secured from a table and/or an approximate expression of an airflow velocity and a terminal velocity. The airflow velocity can be obtained by measuring a movement speed of a piece of paper.

Even in the present embodiment, using water droplets obtained by blowing, with the first air blowing mechanism 21, cold air at the target temperature and saturated humidity which is fed to the inside of the storage 10 to water released from the water feeding apparatus 31 in a shower state, cold air including the water droplets is blown to the inside of the storage 10. Therefore, cold air at the target temperature and saturated humidity can be fed to the storage 10 and water consumption and power consumption can be reduced as compared to conventional evaporators which use an ice machine.

In addition, in the present embodiment, since an airflow generated by the first air blowing mechanism 21 is sent between the water storage tank 23 and the water feeding apparatus 31 through a guide space defined by the guide cylinder 25, the airflow ends up being sent in a direction opposite to a direction in which water droplets fall. Therefore, compared to a state where there is no air blown in the opposite direction, a fall velocity of the water droplets can be reduced and a contact time between the water droplets and the airflow can be extended. As a result, an amount of evaporation from the water droplets can be increased and inside humidity can be controlled to within a target humidity range in a shorter period of time. Furthermore, a reduction in an amount of used water is achieved.

Furthermore, in the present embodiment, since water droplets fall in a vertical direction or downward and the airflow generated by the first air blowing mechanism 21 is directed upward, an extension of the contact time between the water droplets and the airflow is achieved. Therefore, an amount of evaporation derived from the water droplets can be further increased and inside humidity can be controlled to within the target humidity range in an even shorter period of time. Furthermore, a reduction in an amount of used water is achieved.

Table 2 shows a diameter and a terminal velocity of water droplets during free fall of the water droplets through air. A terminal velocity means a velocity at which air resistance keeps fall velocity constant when water droplets free-fall through air.

In Table 2, velocities for water droplet diameters of 1.0 mm to 3.0 mm are approximate actually-measured values obtained by an experiment conducted by Civil and Environmenta Engineering, Kindai University, and a velocity for the water droplet diameter of 0.5 mm is a value calculated using an approximate expression.

TABLE 2

| Water droplet diameter and terminal velocity | |
|---|---|
| Water droplet diameter (mm) | Terminal velocity (m/sec) |
| 0.5 | 2.0 |
| 1.0 | 3.5 |
| 1.5 | 5.0 |
| 2.0 | 6.0 |
| 2.5 | 6.5 to 7.0 |
| 3.0 | 7.5 to 8.0 |

In addition, when feeding of water by the water feeding apparatus 31 is suspended, air is blown to the water surface of the water W in the water storage tank 32, and the relative humidity inside the storage 10 is lower than saturated humidity, water in a shower state is preferably fed from the water feeding apparatus 31. In this case, since air starts to strike generated water droplets, a part of the water droplets is vaporized and freezes due to cold energy, and the water droplets change to a sherbet state. Therefore, desirably, the water droplets in the sherbet state are drained to a drain (not illustrated) instead of being returned to the water storage tank 23.

Even in the present embodiment, a stirring apparatus and/or a heater (a heating apparatus or a temperature regulator) can be used and, additionally, an antifreeze agent can be used in a similar manner to the first embodiment.

Furthermore, while the first air blowing mechanism 21 is used as an apparatus for forming air to be blown so as to oppose water droplets which fall vertically in the present embodiment, another air blowing mechanism which functions in cooperation with the first air blowing mechanism 21 can also be arranged.

Modification of Second Embodiment

Even in the second embodiment, a hydrophilic layer may be formed on the inside surface of the water storage tank 23. In this case, water can be adsorbed and held by the inside surface of the water storage tank 23 on which the hydrophilic layer is formed and, by bringing an airflow into contact with the water, an increase in a generation amount of water vapor derived from the water can be achieved.

In the present modification, a spray of water (water droplets) may be atomized in the water storage tank 23 by the water feeding apparatus 31. For example, in an atmosphere of the internal space of the storage 10 at a low temperature near 0° C., latent heat of vaporization is seven times or more greater than latent heat of solidification. Water droplet diameters of the atomized water droplets are extremely small. Therefore, water droplets freeze in an amount corresponding to an amount of latent heat of vaporization created by evaporation corresponding to a difference from saturation and become rime. The rime is adsorbed and held on the inside surface of the water storage tank 23 in the hydrophilic layer, thawed by the stored water temperature regulator 232 arranged in, for example, a lower part of the water storage tank 23, and controlled to a temperature within a target temperature range.

At this point, preferably, adhesion of water or water droplets to the inside surface of the water storage tank 23 on which the hydrophilic layer is formed is completed while an airflow to be brought into contact by the first air blowing mechanism 21 with the inside surface of the water storage tank 23 is being suspended, and air is blown to the hydrophilic layer once dropping of water is completed.

In this case, water with uniform thickness can be retained on the hydrophilic layer. In addition, penetration of mist and/or rime into the storage 10 can be suppressed or prevented. Furthermore, since a temperature of water droplets fall to 0° C. due to latent heat of vaporization in a low-humidity environment, there is no need for cooling, the stored water temperature regulator 232 may be omitted, and tap water may be used as it is.

Furthermore, water in a shower state or a mist state may be intermittently atomized toward the inside surface of the water storage tank 23 on which the hydrophilic layer is formed while continuously blowing air toward the inside surface of the water storage tank 23. Due to the intermittent atomization, mist can be transpired to an airflow during an atomization suspension period.

An atomized water droplet diameter means a size included in, for example, a range of 10 μm to 100 μm. The water droplet diameter is measured using an intermittent irradiation laser and an ultrafast video camera.

Third Embodiment

In the present embodiment, the evaporation heater 20 described in the second embodiment is used in an open storage (an open display case).

Figure 4:
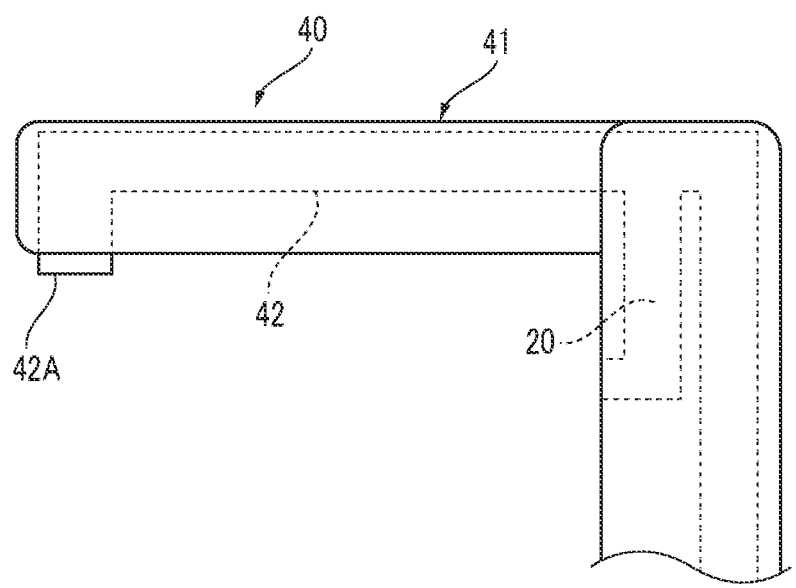
FIG. 4 is a sectional side planar view showing a schematic configuration of a storage according to yet another embodiment of the present invention.

FIG. 4 shows an open storage 40. An outer shape of the storage 40 is made of a C-shaped enclosure 41 bent at approximately 90 degrees. While a lower part of the enclosure 41 is not described, generally, the lower part of the enclosure 41 is constituted of a case in which objects to be stored such as food are to be arranged. A cold air duct 42 is arranged inside the enclosure 41, and the evaporation heater 20 is arranged in an internal space of the cold air duct 42.

Figure 5:
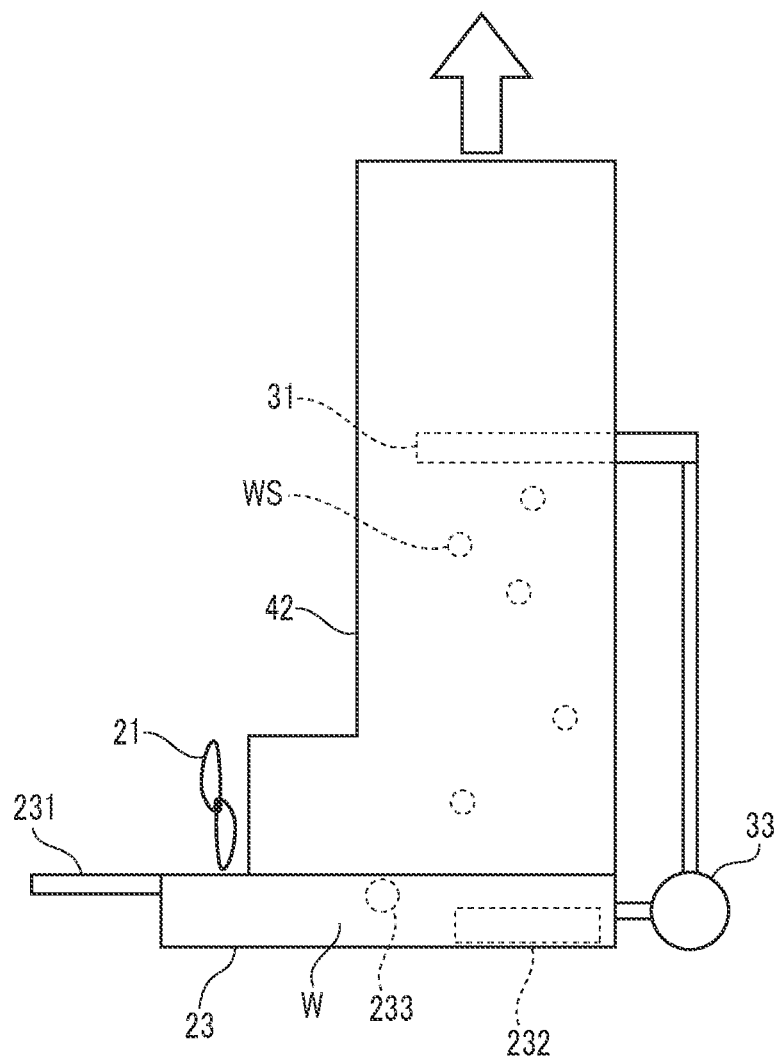
FIG. 5 is a schematic configuration sectional side planar view showing an evaporation heater of the storage shown in FIG. 4.
Figure 6:
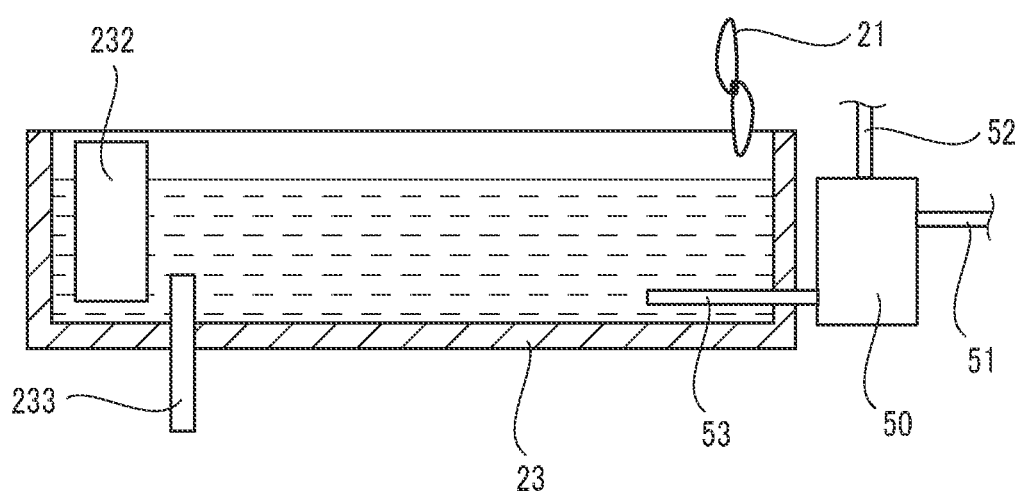
FIG. 6 is a sectional side planar view of the evaporation heater provided with a fine bubble generation apparatus and a release pipe according to the embodiment of the present invention.

As shown in FIG. 5, while the evaporation heater 20 adopts a similar aspect as the evaporation heater 20 according to the second embodiment, water W is pumped using a pump 33 from the water storage tank 23 instead of the water feeding apparatus 31 and water in a shower state or a mist state is released or fed by the water feeding apparatus 31. At this point, while an airflow is sent from the first air blowing mechanism 21 to the cold air duct 42, the air collides with the water W in a shower state and becomes water droplets WS.

Since a temperature of water vapor generated from the water droplets WS generates latent heat of vaporization by reducing a temperature of surrounding water droplet water in a similar manner to the second embodiment, for the water vapor temperature in a case where a water droplet diameter is small, the temperature of water droplet water approaches 0° C. due to the water droplet water being cooled by the latent heat of vaporization and the temperature of water vapor generated from the water droplets also approaches 0° C. On the other hand, in a case where the water droplet diameter is large, the temperature of the water droplet water approaches a temperature of the stored water in the water storage tank and the temperature of generated water vapor also approaches the vicinity of the temperature of the stored water.

Therefore, the stored water temperature and the water droplet diameter are determined in accordance with a target temperature. With a 15° C. open refrigerated display case for vegetables, due to leakage of water vapor to outside of the display case, inside humidity drops to near 50% in spring and/or autumn and the display case becomes even drier in winter, thereby necessitating a large amount of humidification, but inside humidity can be raised to saturated humidity by blowing air to water droplets at a temperature higher than a target temperature. Due to control using a humidity sensor, excess water can be prevented from flowing into the display case.

Even in the present embodiment, using water droplets obtained by blowing, with the first air blowing mechanism 21, cold air at the target inside temperature and saturated humidity which is fed to the inside of the storage 40 to water released in a shower state or a mist state from the water feeding apparatus 31, cold air including the water droplets is discharged from an exhaust port 42A through the cold air duct 42 and caused to strike the stored objects arranged in a lower part of the storage 40, and the stored objects are managed at a predetermined target inside temperature and saturated humidity to maintain quality of the stored objects. Therefore, in the case of use at near 0° C., water consumption and power consumption can be reduced as compared to conventional evaporators which use an ice machine.

In addition, while antifreeze agents cannot be conventionally used in open display cases due to indoor diffusion of vaporized ethanol and/or aerosol of salt, in the present embodiment, since the quality of stored objects can be maintained without particularly using an antifreeze agent, the evaporation heater according to the present invention can also be applied to open storages such as that described above.

Furthermore, the storage according to the present embodiment is capable of preventing drying due to being set to saturated humidity, and the storage is suitable for storing meat and/or vegetables at 0° C. due to reduced degradative enzyme activity, suitable for storing fish at 10° C. being a temperature at which dissolution of ATP of fish is slowest as shown in Table 1, and suitable for storing frozen goods at −25° C. due to reduced enzyme activity by being lower than −23° C. which is the coagulation temperature of saline water.

Moreover, given that near 35° C. is a temperature at which taste buds are most sensitive, 40° C. is a temperature at which proliferation of food poisoning bacteria stops and also a fish collagen denaturation limit temperature. The storage according to the present embodiment is also usable as a 40° C.-storage for dishes prior to serving. In addition, 50° C. to 55° C. represent temperatures at which food poisoning bacteria dies out and a threshold temperature at which protein is not denatured in a short period of time and, since the temperatures approach a gelatinization temperature of starch, aging does not occur.

Therefore, the storage according to the present embodiment is also usable for storing low-temperature cooking and/or gelatinized starch.

the scope and/or gist of the invention, and are also included in the scope of the invention as set forth in the claims and equivalents thereof.

For example, a bubble generation apparatus (constituted of a fine bubble generation apparatus or the like) which generates bubbles in stored water may be provided. The bubbles in the water take in water vapor from its surroundings and become high-humidity air. In addition, when the bubbles come up to the water surface, the bubbles rupture and spray minute water droplets near the water surface. The sprayed minute water droplets are vaporized in a short period of time by bringing an airflow into contact with the water and raise a relative humidity of the blown air on the water surface, and the humidity inside the storage can be raised in a short period of time by feeding high-humidity blown air into the storage.

REFERENCE SIGNS LIST

10 Constant-temperature high-humidity storage
11 Inside temperature humidity sensor
20 Evaporation heater
21 First air blowing mechanism
22 Second air blowing mechanism
23 Water storage tank
231 Water feed pipe
232 Stored water temperature regulator
24 Inside temperature regulator
25 Guide cylinder
26 Stirrer
27 Control apparatus
31 Water feeding apparatus
50 Micro-bubble generation apparatus

TABLE 3

| Temperature/° C. | Change in food | Food processing per temperature zone |
| --- | --- | --- |
| −60 | Fish meat vitrification temperature<br>ATP dissolution is slowest | Long-term frozen storage |
| −50 | Fish meat rubberization temperature | |
| −30 or lower | Storage temperature at which methemoglobin is not formed in frozen tuna meat | Frozen storage of tuna |
| −23 or lower | Amorphization temperature of saline-containing food | Frozen storage of food |
| 0 to −5 | Ice surface melting (sublimation is fastest)<br>Starch white-waxing temperature zone | Sherbet |
| 10 | Fish ATP dissolution is slowest among refrigeration temperatures<br>Growth rate of food poisoning bacteria is slow | Refrigerated storage of fresh fish |
| 30 to 45 | Fish collagen denaturation temperature | Fish |
| 50 | Meat myosin protein denaturation start temperature | Meat, fish, poultry, vegetables |
| 50 to 55 | Temperature zone where thermal contraction of muscle stops<br>Food poisoning bacteria start dying | Low-temperature cooking |
| 56 | Meat collagen denaturation start temperature | Tenderizing of tough meat |
| Near 60 | Starch gelatinization start temperature | |
| 62 | Protein coagulation start temperature (discoloration start temperature) | Tofu, eggs |
| 62 to 66 | Meat actin protein denaturation start temperature | Low-temperature cooking |
| 92 | Cellulose breakdown start temperature | Vegetables, root vegetables |

Having described several embodiments of the present invention, it is to be understood that the embodiments are merely presented as examples and are not intended to limit the scope of the invention. These novel embodiments can be implemented as a wide variety of other embodiments, and various omissions, replacements, and alterations can be made without departing from the gist of the invention. These embodiments and/or modifications thereof are included in 51 Water feed pipe
52 Air inlet pipe
53 Micro-bubble-containing water discharge pipe
54 Drain pipe
S Stored object
W Water
WS Water droplet

The invention claimed is:

1. An evaporation heater arranged in a constant-temperature storage, the evaporation heater comprising:
   a water storage tank provided in an internal space of an enclosure of the evaporation heater;
   a stored water temperature regulator configured to control a temperature of at least one of feed water to be fed to the water storage tank and stored water in the water storage tank so that the temperature of the stored water is within a target stored water temperature range which is set to be higher than a target inside temperature range of the constant-temperature storage;
   an air blowing mechanism including a fan configured to cause an airflow in contact with the stored water in the water storage tank to flow into an inside of the constant-temperature storage; and
   an inside temperature regulator configured to control a temperature of the airflow generated by the air blowing mechanism so that a temperature in the constant-temperature storage is adjusted within the target inside temperature range.

2. The evaporation heater according to claim 1, comprising
   a stirrer configured to stir the water stored in the water storage tank.

3. The evaporation heater according to claim 1, comprising
   a water feeding apparatus configured to feed water in a shower state or a mist state to the water storage tank.

4. The evaporation heater according to claim 3, comprising
   a guide member configured to guide the airflow generated by the air blowing mechanism in a direction opposite to a feed direction of water with respect to the water storage tank by the water feeding apparatus.

5. The evaporation heater according to claim 1, wherein
   a hydrophilic layer which has an affinity for water is provided on an inside surface of the water storage tank.

6. The evaporation heater according to claim 3, wherein
   the water feeding apparatus is configured to feed water in a shower state or a mist state with respect to the water storage tank during a period in which an operation of the air blowing mechanism has been suspended.

7. The evaporation heater according to claim 3, wherein
   the water feeding apparatus is configured to intermittently feed the water in a mist state during a period in which the airflow generated from the air blowing mechanism is being fed.

8. The evaporation heater according to claim 1, wherein
   the water stored in the water storage tank contains an antifreeze agent.

9. The evaporation heater according to claim 1, further comprising
   a bubble generation apparatus configured to generate bubbles in the stored water of the water storage tank.

10. The evaporation heater according to claim 2, comprising
    a water feeding apparatus configured to feed water in a shower state or a mist state to the water storage tank.

11. The evaporation heater according to claim 2, wherein
    a hydrophilic layer which has an affinity for water is provided on an inside surface of the water storage tank.

* * * * *